United States Patent

Walker et al.

[11] Patent Number: 5,351,478
[45] Date of Patent: Oct. 4, 1994

[54] COMPRESSOR CASING ASSEMBLY

[75] Inventors: Roger C. Walker, Middletown; Richard J. Fallon; Harold P. Rieck, Jr., both of West Chester; John D. Bibler, Cincinnati, all of Ohio

[73] Assignee: General Electric Company, Cincinnati, Ohio

[21] Appl. No.: 891,494

[22] Filed: May 29, 1992

[51] Int. Cl.⁵ .............................. F02C 6/18
[52] U.S. Cl. ...................... 60/39.07; 415/144
[58] Field of Search ........... 60/39.07, 39.29, 39.091; 415/144

[56] References Cited

U.S. PATENT DOCUMENTS

| | | | |
|---|---|---|---|
| 2,848,156 | 8/1958 | Oppenheimer | 415/144 |
| 3,597,106 | 8/1971 | Anderson | 415/144 |
| 3,632,223 | 1/1972 | Hampton | 415/144 |
| 3,777,489 | 12/1973 | Johnson et al. | 415/144 |
| 3,966,355 | 6/1975 | Pierpoline | 415/144 |
| 4,155,680 | 5/1979 | Linko, III et al. | 60/39.091 |
| 4,177,003 | 8/1980 | Remberg et al. | 415/144 |
| 4,711,084 | 12/1987 | Brocket | 60/39.07 |
| 4,827,713 | 5/1989 | Peterson et al. | 60/39.07 |
| 4,841,726 | 6/1989 | Burkhardt | 60/226.1 |
| 4,844,689 | 7/1989 | Seed | 415/169.1 |
| 4,893,983 | 1/1990 | McGreehan | 60/39.29 |
| 5,059,093 | 6/1990 | Khalid et al. | 60/39.07 |
| 5,155,993 | 10/1992 | Baughman et al. | 60/39.07 |
| 5,160,241 | 11/1992 | Glyn | 415/144 |

FOREIGN PATENT DOCUMENTS

| | | |
|---|---|---|
| 0110757A | 6/1984 | European Pat. Off. . |
| 0348676A | 1/1990 | European Pat. Off. . |
| 2186602 | 1/1974 | France . |
| 2534982 | 4/1984 | France . |
| 0987625 | 3/1965 | United Kingdom .......... 60/39.07 |
| 2054741A | 2/1981 | United Kingdom . |
| 2183296A | 6/1987 | United Kingdom . |

OTHER PUBLICATIONS

Ser. No. 07756654 Sep. 9, 1991 Glynn.
Ser. No. 07799236 Nov. 27, 1991 Baughman.
Ser. No. 07839275 Feb. 25, 1992 McGreehan, et al.
Ser. No. 07506314 Apr. 9, 1990 Baughman.

Primary Examiner—Richard A. Bertsch
Assistant Examiner—Michael I. Kocharov
Attorney, Agent, or Firm—Jerome C. Squillaro; Nathan D. Herkamp

[57] ABSTRACT

An apparatus and method for minimizing compressor casing distortion due to bleed air extraction wherein the compressor casing includes an annular outer casing having at least one outlet duct, an annular inner casing disposed co-axially with the outer casing and spaced radially inwardly therefrom to define a plenum, two radial discs extending inwardly from the outer casing defining a plenum, a plurality of small area bleed openings located in the inner casing for imparting a radial velocity to the bleed air greater than the circumferential velocity entering the plenum, an air tube located over each bleed opening, and a baffle plate located on top of the air tubes and communicating with the radial discs for supporting the casings, whereby the bleed air impinges on the outer casing and controls distortion by sufficiently reducing the circumferential temperature gradient forming at the outer casing.

7 Claims, 3 Drawing Sheets

COMPRESSOR CASING ASSEMBLY

BACKGROUND OF THE INVENTION

The present invention relates to gas turbine engines and more particularly, to the compressor casing designs of aircraft gas turbine engines.

A typical aircraft gas turbine engine includes a compressor for pressurizing air which subsequently is mixed with fuel and ignited in the combustor section and the resulting combustion gases power the turbine. The compressor and turbine are surrounded by casings through which air is either extracted or distributed. Typically, a portion of the air is extracted from the compressor as bleed air and is used to cool engine parts such as the turbines, blades, bearings, and gears, as well as to supply cabin pressure to the aircraft.

In a typical compressor, an inner casing or flow path is concentric with an outer casing and mounts stator vanes. The inner casing also surrounds the rotor blades of the compressor. Bleed air extracted from the compressor is typically channeled through the inner casing, gathered into a plenum formed between the inner and outer casings, and exited through pipes in the outer compressor casing.

One prior art device for extracting or bleeding air includes providing the inner casing with bleed holes or slots which channel a portion of the compressor air into the plenum. The bleed air then flows circumferentially in the plenum to the nearest exit pipe in the outer casing where it is discharged from the compressor. A problem with this method of extraction is that, as the air flows from the supply slots in the inner casing to the exit pipes in the outer casing, the air velocity increases. Accordingly, the heat transfer capability of the bleed air, which is directly proportional to its velocity, is relatively low at the midpoint between two exit pipes and relatively high at the exit pipes.

As the bleed air heats the outer casing, the portion of the outer casing adjacent the exit pipes will expand more rapidly than the portion of the casing between the exit pipes, and this uneven heating causes the outer casing to distort and become out-of-round. Since the inner casing is supported by the outer casing, the inner casing also becomes out-of-round. This distortion is undesirable since the inner casing surrounds the rotor blades, and increased clearance between the blade tips and the inner casing results in a decrease of compressor efficiency.

Applicant has previously designed an air channeling assembly for bleeding air from a compressor for reducing circumferential thermal distortion of the casings. The air channeling assembly includes a plurality of baffles disposed in the plenum and spaced radially inwardly from the outer casing. Each of the baffles includes an intermediate opening communicating with a different one of the exit pipes, and opposing ends extending circumferentially away from the intermediate opening. The baffles provide a flow shield between the inner and outer casings around each of the exit pipes and channel air through the intermediate opening to the associated exit pipe.

Although this assembly reduces circumferential thermal distortion of the compressor casing, the assembly adds complexity and expense to the manufacture of the compressor, as well as added weight to the compressor. Therefore, a need exists for an apparatus for reducing circumferential thermal distortion of the compressor casings that does not add complexity, expense or additional weight to the compressor.

SUMMARY OF THE INVENTION

The present invention is a compressor casing assembly which reduces the circumferential casing temperature gradient associated with the extraction of bleed air from a compressor of a gas turbine engine, thereby reducing casing distortion. The casing assembly includes an inner casing having a plurality of supply openings having areas smaller than prior art structures The smaller area supply openings impart an outward radial velocity to the bleed air as it enters the plenum between the inner and outer casings. The outward radial air velocity is greater than the circumferential air velocity, causing the bleed air to impinge on the outer casing wall. This impingement of the bleed air results in more uniform heating of the outer casing thereby reducing the circumferential temperature gradient of the outer casing, which minimizes distortion of the casing.

In the preferred embodiment, the invention is directed to the exit of the stage 7 stator disk of an aircraft gas turbine engine. The inner diameters of the adjacent support disks are increased, and a cylindrical baffle plate is inserted between the support disks and the inner casing of the compressor. The baffle plate includes a plurality of radially-extending air tubes which communicate with the small area supply openings. In the preferred embodiment, there are 28 pairs of supply openings and air tubes, in contrast with prior art casing designs having no more than eight supply openings and no air tubes. The increase in supply opening number, the reduction of supply opening area and the use of air tubes reduces the magnitude of temperature gradients along the outer casing.

Accordingly, it is an object of the present invention to provide a casing assembly for a gas turbine engine which minimizes the distortion of the outer compressor casing; a casing assembly which reduces the circumferential temperature gradient associated with the extraction of bleed air; a casing assembly which conveys bleed air into the casing plenum at a radial velocity greater than the circumferential velocity of the bleed air as it travels to and exits the outlet duct; a casing assembly which eliminates the need for baffles for the channeling of bleed air; and a casing assembly which is relatively inexpensive and easy to manufacture.

These and other objects of the present invention will be better understood by a reference to the following detailed description, the accompanying drawing and the appended claims.

DETAILED DESCRIPTION

Figure 1:
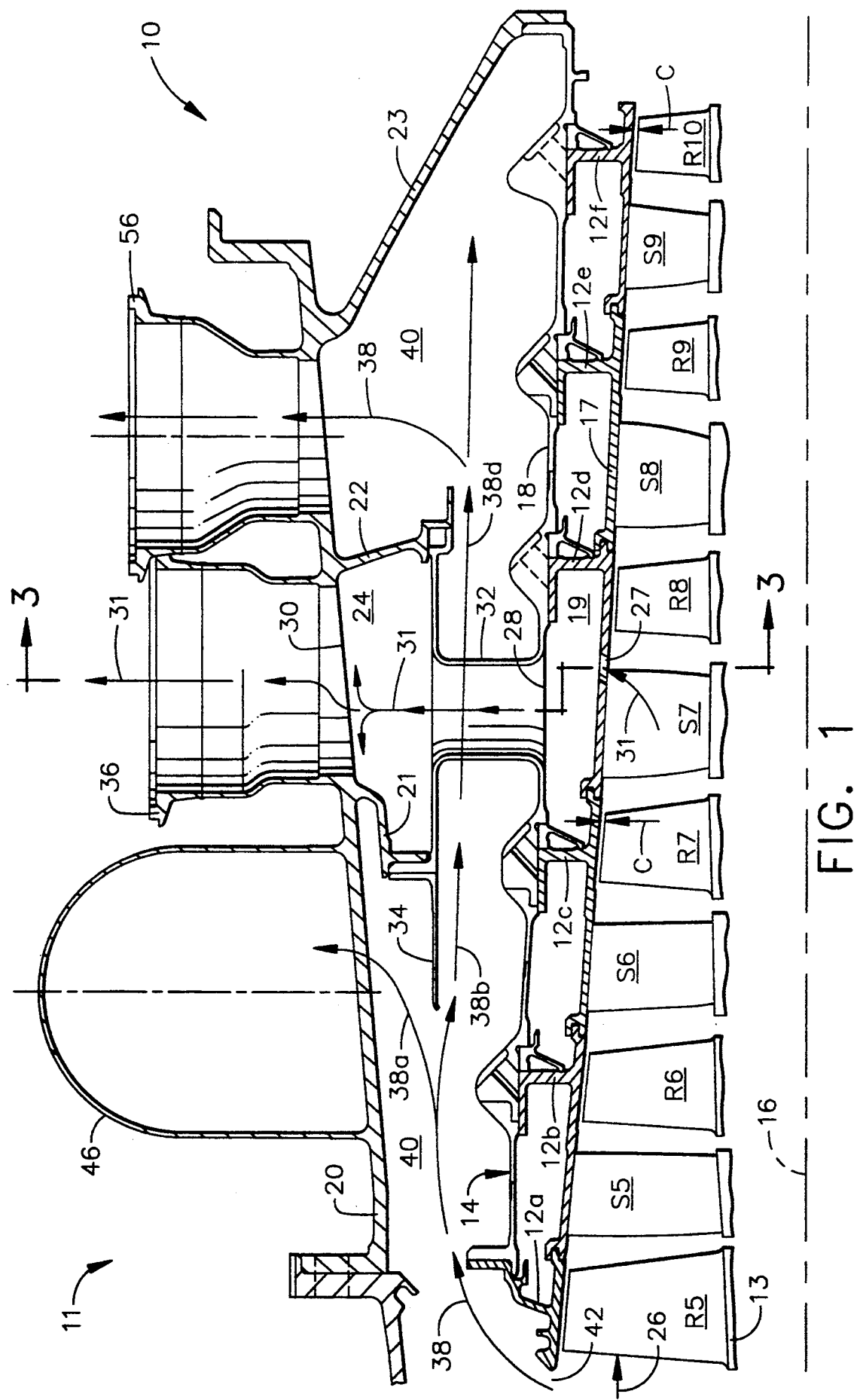
FIG. 1 is a schematic, elevational view in section of an exemplary gas turbine engine compressor incorporating the present invention for the extraction of bleed air.

As shown in FIG. 1, an axial flow compressor, generally designated 10, of a gas turbine engine includes compressor stages 5 through 10 having annular rows of rotor blades R5, R6, R7, R8, R9, R10 mounted on a shaft 13 and rotated by the turbine section (not shown) of the engine. An inner, cylindrical casing 14 includes annular rows of stator vanes S5, S6, S7, S8, S9 projecting radially inwardly toward the engine centerline 16 and spaced between the rows of blades R5, R6, R7, R8, R9, R10. The inner casing 14 comprises an inner wall 17 and an outer wall 18 defining an inner casing plenum 19 therebetween.

The inner casing 14 is disposed radially inwardly from a cylindrical outer casing 20 and is supported by axially-spaced, radially-extending disks 21, 22, and an aft compressor cone 23. The inner casing 14 is coextensive with the outer casing 20 about the engine centerline 16 and forms an annular compressor plenum 24 through which the disks 21, 22 extend.

During operation of the compressor 10, air flow 26 flows axially downstream through the several rows of blades R5, R6, R7, R8, R9, R10 and vanes S5, S6, S7, S8, S9 and is compressed thereby. The inner wall 17 of inner casing 14 is spaced radially outwardly from the tips of the blades R5-R10 to define tip clearances C which are made as small as possible to prevent the leakage of compressor air 26 which would decrease the efficiency of the compressor 10.

Compressor air 26 is bled in stage 7 (aft of stator vanes S7) by initially passing from the row of rotor blades S7 and stator vanes S7 through a plurality of circumferentially- spaced bleed holes 27 in the inner wall 17 of the inner casing 14 into the inner casing plenum 19. In the preferred embodiment, there are ninety-nine bleed holes 27 located in the inner wall 17 of the inner casing. Bleed air 31 is drawn into the compressor plenum 24 at a high rate of speed through a plurality of small area circumferentially spaced bleed openings 28 located in the outer wall 18 of the inner casing 14. In the preferred embodiment, there are twenty-eight bleed openings 28 in the outer wall 18.

The inner and outer walls 17, 18 of the inner casing 14 are separated and supported by a plurality of circumferentially-spaced side walls 12a, 12b, 12c, 12d, 12e, and 12f.

Positioned radially-outwardly of each bleed opening 28 is an air tube 32 for channeling bleed air 31 to the compressor plenum 24 towards the outer casing 20. Located over the top surface of each air tube 32 is a cylindrical baffle plate 34 which communicates with the disks 21, 22. Baffle plate 34 connects the disks 21, 22 with the air tube 32 and collectively, with the aft compressor cone 23, supports the inner and outer casings 14, 20.

Figure 2:
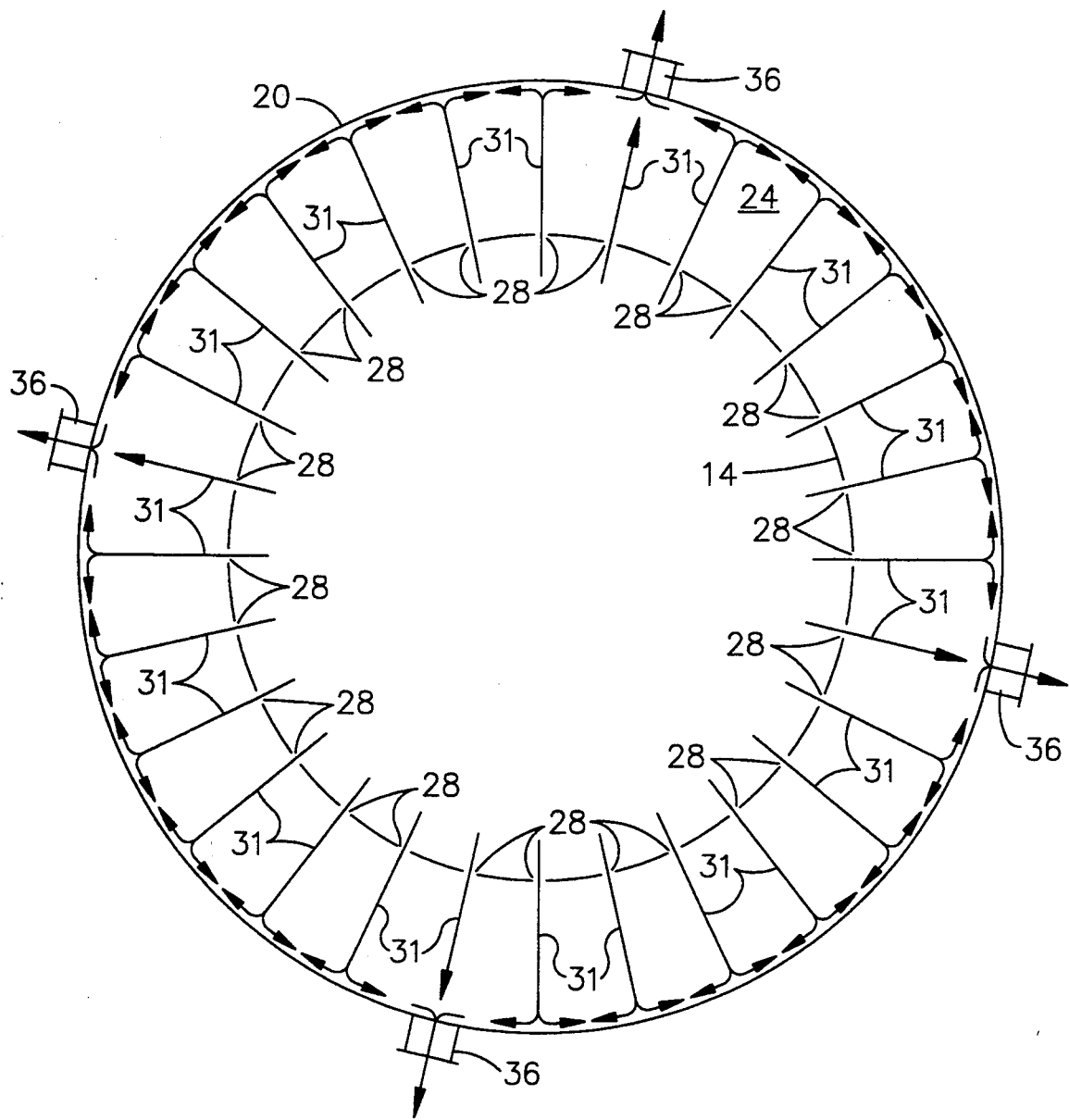
FIG. 2 is a schematic cross-sectional view of the compressor taken along line 3—3 of FIG. 1, illustrating a plurality of small area supply openings in the inner casing.

The bleed air 31 is collected in the compressor plenum 24 and is channeled radially outwardly through the outer casing 20 and exited through an outlet duct 36. At least two circumferentially-spaced outlet ducts are used for each stage, with three or four as shown in FIG. 2, or more being used as desired.

The bleed openings 28 of the present invention have a small area such that a plurality of bleed openings are incorporated within the outer wall 18 of the inner casing 14. The exact number of small area supply openings can be varied so long as the area is sufficiently small that the openings can impart a radial velocity to the bleed air that is greater than the circumferential velocity of the bleed air as it enters the compressors plenum 24.

Figure 3:
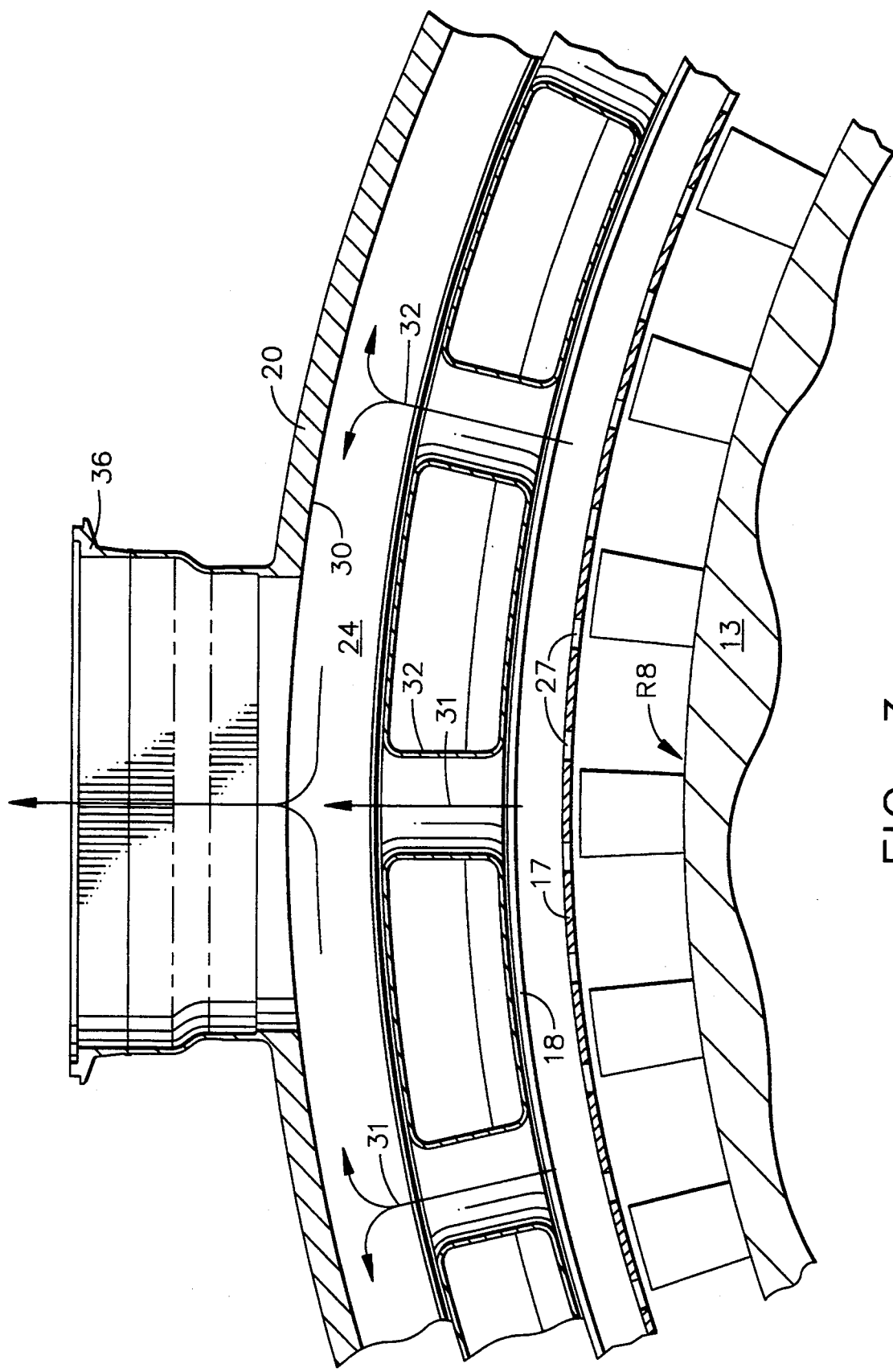
FIG. 3 is an enlarged section view of FIG. 2, illustrating the impingement of the bleed air on the outer casing.

As shown in FIG. 3, the bleed air 31 travels through the plenum 24 and impinges on the inner surface 30 of the outer casing 20, in effect bouncing off of the inner surface of the outer casing and continually moving within the plenum until exiting through the outlet duct 36, This bouncing effect of the bleed air 31 within the compressor plenum 24 permits the bleed air to uniformly control the circumferential heat transfer created in the bleed air as it travels circumferentially through the plenum. Since the heat transfer capability of the bleed air is evenly dispersed within the plenum, the circumferential temperature gradient is sufficiently reduced to deter distortion of the outer casing. The temperature gradient is reduced by a factor of sixty percent from prior casing designs.

By reducing the circumferential thermal distortion of the outer casing 20, the corresponding circumferential thermal distortion of the inner casing 14 is also reduced. The circumferential variation of the tip clearance C is maintained, thereby reducing efficiency losses of the compressor 10 due to leakage of compressor air 26.

Tip clearance problems were particularly prevalent along the inner casing 14 at rotor stages R7 and R10. These positions were more susceptible to distortion because they are where the aft compressor cone 23 connects the compressor casings and where support 21 previously connected the compressor casings. The present compressor casing design maintains tip clearance of all the rotor blades by reducing the temperature gradient of casing 20.

The inner casing 14 is also cooled by bleed air 38 which enters the low pressure-turbine plenum 40 through a bleed hole 42 in the inner casing immediately forward of stage 5 between the inner casing 14 and the outer casing 20. The baffle plate.34 extends forwardly into stage 6 and deflects a portion of the bleed air 38a upwardly toward the anti-icing exit port 46, for use when the anti-icing function is needed, and deflects a portion of the bleed air 38b downwardly toward the air tube 32.

Another portion of the downwardly deflected bleed air 38d continues between the air tubes 32 and into the low pressure turbine plenum 40 in stages 8, 9 and 10. Finally, bleed air 38 exits the low pressure turbine plenum 40 through a low pressure turbine outlet duct 56.

Although the foregoing method of extracting bleed air is particularly useful in the gas turbine engine compressor stages for collecting bleed air and discharging it through the outlet ducts in the outer casing, the invention may also be used in turbine stages for distributing bleed air channeled thereto. Conventional turbines typically include a distribution manifold, much like the compressor plenum 24 illustrated in FIG. 1, surrounding the rotor blades and stator vanes thereof. Inlet ducts similar to those illustrated in FIG. 1 are also provided for channeling the bleed air into the distribution manifold. As in the compressor, the velocity of the bleed air channeled into the turbine is greatest as it flows through the inlet ducts and decreases between the inlet ducts. Similar circumferential thermal distortion also results in the turbine casing. Accordingly, by incorporating a plurality of small area bleed openings in the inner casing of the turbine, the bleed air will have a relatively high velocity as it enters the distribution manifold and will impinge upon the outer casing thereby dominating the circumferential temperature gradient and minimizing the distortion of the outer turbine casing.

The preceding description has been presented with reference to a presently preferred embodiment to the invention shown in the drawings. Workers skilled in the art and technology to which this invention pertains will appreciate that alterations and changes in the described structure can be practiced without departing from the spirit, principals and scope of this invention.

What is claimed is:

1. A casing assembly for reducing bleed air temperature gradient of a gas turbine engine comprising:
    an outer annular casing having at least one outlet duct;
    an annular inner casing disposed co-axially within the outer casing and placed therefrom to define a plenum;
    a first radial disk and a second radial disk extending from the outer casing toward the inner casing for supporting the inner and outer casings and defining said plenum between the casings;
    a plurality of bleed openings located in the inner casing for imparting a radial velocity to the bleed air that is greater than the circumferential velocity of the bleed air entering the plenum, whereby the bleed air impinges on the outer casing reducing the circumferential temperature gradient forming at the outer casing sufficiently to prevent distortion of the casing assembly as the bleed air exits the outlet duct; and
    an air tube located in the plenum over each bleed opening for directing the bleed air toward the outer casing.

2. The compressor casing of claim 4 wherein the means for supporting the casings further comprises a baffle plate located over the air tubes for engaging the radial discs.

3. The compressor casing of claim 2 wherein the means for supporting the casings further comprises an aft compressor cone extending from the outer casing to the inner casing.

4. The casing assembly of claim 3 wherein the bleed openings are located within a compressor stage.

5. The casing assembly of claim 4 wherein the temperature gradient is reduced sixty percent.

6. A bleed air system for a gas turbine engine comprising:
    an annular outer casing having at least one outlet duct;
    an annular inner casing disposed co-axially with the outer casing and spaced radially inwardly therefrom;
    radial disks extending from the outer casing toward the inner casing and defining a plenum;
    an aft compressor cone extending from the outer casing to the inner casing to support the casings;
    a plurality of bleed openings located in the inner casing for imparting a radial velocity to the bleed air which is greater than the circumferential velocity of the bleed air entering the plenum, whereby the high velocity bleed air impinges on the outer casing and prevents distortion of the outer casing by reducing a circumferential temperature gradient forming at the outer casing as the bleed air exits the outlet duct.
    an air tube located within the plenum over each bleed opening for directing the bleed air toward the outer casing; and
    a baffle plate located over said air tube for engaging the radial discs.

7. The bleed air system of claim 6 wherein the system is located within a compressor stage.

* * * * *